United States Patent [19]
Cola

[11] 3,891,022
[45] June 24, 1975

[54] PROCESS FOR MANUFACTURING CORES AND MOULDS

[75] Inventor: Giorgio Cola, Rome, Italy

[73] Assignee: Centro Sperimentale Metallurgico S.p.A., Rome, Italy

[22] Filed: May 29, 1973

[21] Appl. No.: 364,239

Related U.S. Application Data
[63] Continuation of Ser. No. 70,282, Sept. 8, 1970, abandoned.

[30] Foreign Application Priority Data
Sept. 11, 1969 Italy .................................. 21930/69

[52] U.S. Cl. ........... 164/41; 249/183; 425/DIG. 14; 164/235
[51] Int. Cl. ............................................... B22c 9/28
[58] Field of Search ............. 164/37, 40, 41, 44, 45, 164/187, 213, 222, 235, 245; 425/DIG. 14; 249/183

[56] References Cited
UNITED STATES PATENTS

| | | | |
|---|---|---|---|
| 1,142,342 | 6/1915 | McNeil ........................ | 425/DIG. 14 |
| 2,345,977 | 4/1944 | Howald et al................ | 425/DIG. 14 |
| 2,476,726 | 7/1949 | Haas............................. | 164/37 |
| 2,903,762 | 9/1959 | Caudron ...................... | 164/40 X |
| 3,414,951 | 12/1968 | Schulze........................ | 249/183 X |
| 3,550,670 | 12/1970 | Greenwald................... | 164/37 |
| 3,552,480 | 1/1971 | Harris .......................... | 164/45 X |

Primary Examiner—R. Spencer Annear

[57] ABSTRACT

In the manufacture of cores and moulds, an inflatable pattern for use in the production of a foundry mould with a fluidal moulding material. The pattern includes a thin-walled flexible body having inlet means for the admission of gas. In addition, the thin-walled body is made from either elastomers or extendible plastics and is preshaped and dimensioned so that in its inflated condition the pattern defines the desired profile for the moulding material.

In practice, the moulding material is poured about and in contact with the extendible pattern (or core box) while the pattern is concurrently filled with fluid to provide and maintain its preshaped and dimensioned walls. Thereafter, the pattern is maintained in its extendible condition as the moulding material sets and then the fluid is withdrawn from the pattern to permit its removal from the moulding material.

9 Claims, 5 Drawing Figures

PROCESS FOR MANUFACTURING CORES AND MOULDS

This is a continuation, of application Ser. No. 70,282, filed Sept. 8, 1970, now abandoned.

The present invention refers to the production of cores and moulds used in founding for pouring castings, which may be complex in form.

In particular the present invention refers to the production of cores and moulds by the simultaneous use of self-hardening fluidified moulding materials and patterns (and core boxes) made of elastomers or plastic materials, preferably inflatable and to the inflatable patterns which are so used.

It is well known that in the production of foundry moulds and cores the material forming the pattern and the core box must meet some requirements inherent in the moulding process itself. In fact moulding is carried out by ramming a sandy material inside the moulding box with the aid of mechanical means; throwing the moulding material, jolts, compression, compressed air rammers, etc. This means that the pattern material must resist severe mechanical stresses and wear; therefore, according to the length of the series, the patterns must be made of wood, aluminum, brass, etc.

Furthermore the form of the casting and hence of the pattern (or core box) is sometimes such as to present lugs forming undercuts in the direction perpendicular to the parting plane, considerably complicating the moulding work. Normally these drawbacks are obviated by means of outside cores (loose pieces) or by the process of the solid mould, which consists in leaving part of the pattern in place, formed of expanded polystyrene easily gasifiable when the incandescent metal passes. These processes are wasteful, however, because of the increased moulding and dressingoff times and they are also detrimental to the appearance of the casting owing to the marks left in the chiselled zones.

The process covered by this invention offers a new solution of the above problems and in many cases allows elimination of the following requirements:
- presence of one or more parting planes;
- absence of lugs forming undercuts;
- absence of back drafts;
- presence of drafts.

The process can be applied to numerous castings and lends itself to the construction not only of full view patterns, but also of patterns adapted in plate or parts of patterns inserted on traditional patterns. In addition the process allows precision castings with minimum stock allowances to be obtained.

The process covered by the present invention consists in producing foundry moulds and/or cores by using patterns and/or core boxes made partly or entirely from materials selected among the following:
1. extendible elastomers;
2. moderately extendible elastomers or plastic materials;
3. semirigid elastomers or plastic materials.

In the first case the patterns are hollow and take on the form, consistency and rigidity required by being filled with fluids to suitable pressure levels.

In the second case the patterns (and/or core boxes) are hollow and take on the required consistency and rigidity by being filled with fluids to suitable compression levels.

In both cases after moulding and setting of the mould (and/or the core) the patterns (and/or the core boxes) are extracted after a vacuum has been formed in their interior.

In the third case the patterns (and/or core boxes) can be solid or hollow and already have the required form, rigidity and consistency. In this case extraction is made possible by exploiting only the elastic properties of the elastomer or the plastic material.

In the present description the word "elastomer" is used to indicate natural or synthetic materials, endowed with the particular good elastic properties of elasticity and elastic yield.

Illustrative examples of elastomers are synthetic or natural rubbers treated with conventional processes.

The replacement of traditional patterns and core boxes by patterns and core boxes of the types proposed is made possible by the use of a fluid and self-hardening moulding material which, only needing to be poured, requires no ramming energy. The above moulding material can be selected, within the vast range available, according to the type of alloy, the requirements of surface finish, etc. Furthermore, in relation to the particular properties required on the surface of castings, highly refractory, high thermal conductivity or diffusion moulding materials can be used, in order to give structural fineness, high hardness, etc.

For this purpose, by means of particular supports fastened to the moulding boxes, it may be possible to position coolers in the moulds, or by immersion incorporate suitable water circulation tubular cages, which may be shaped.

Preferable moulding materials are sandstone sands, and, above all, the so-called "liquid sands," such for example, as the liquid sands described in Italian Pat. No. 780,028 in the name of the same holder.

In particular it has now been found, and in a certain sense it forms a further object of the present invention, that particularly advantageous results are obtained by employing a moulding material consisting of a liquid sand containing from 78 to 85 percent by weight of sand, from 8 to 12 percent by weight of aluminous cement, from 7 to 10 percent by weight of water, and from 0.03 to 0.20 percent by weight of a surface active agent, with the possible addition of a setting accelerator consisting for example in lithium chloride added at the rate of 0.05 to 0.35 percent in relation to the weight of the aluminous cement only.

The right elastomer to make patterns and core boxes must be selected according to the nature (acid, base, etc.) and the physical properties (temperature, fluidity, etc.) of the material used for moulding.

In order to obtain the required form and/or consistency, the patterns and core boxes can be filled by means of: - substances in the gaseous state, such as air, other gases or mixtures thereof; - substances in the liquid state, such as water, other liquids, solutions, suspensions, etc.; - low-melting solid substances of organic or inorganic nature, such as waxes, metal alloys and similar, which can easily be brought to the liquid state during the stages of filling and emptying the pattern.

The pressure to be assigned to the compressed fluid contained in the interior of the hollow pattern varies according to the geometry of the pattern, the fluidity and specific gravity of the moulding material, while the outside profile of the casting is guaranteed by suitable preshaping and dimensioning of the pattern walls. Selection of the proposed technologies varies case by case and depends on the length of the series, the complexity of the design of the casting, the absence or presence of parting planes, the number of cores, the core assembling techniques, the equipment available, etc.

The characteristics, advantages, possible applications and further details of the process in question will be clearly understood by means of the following examples and the attached figures. Clearly, however, the invention is not limited to these examples, while they are themselves open to improvements.

Referring first to the drawings:

FIGS. 1A and 1B are enlarged vertical sections of a detail of FIG. 1;

EXAMPLE 1

Moulding of a roll for a rolling mill

Figure 1:
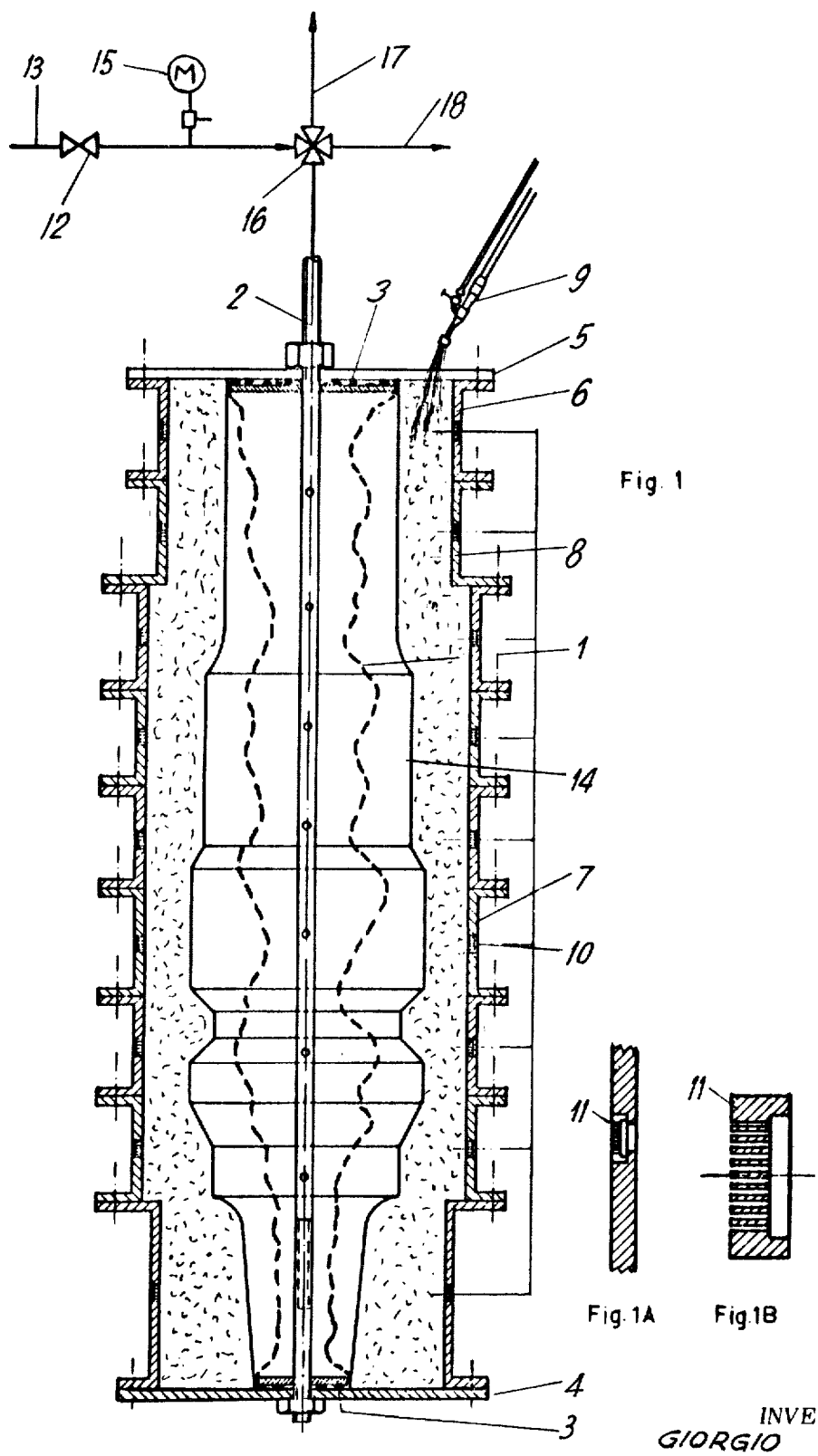
FIG. 1 is a vertical section in elevation illustrating one embodiment of the invention.

The example is illustrated by reference to FIGS. 1, 1A and 1B. FIG. 1 is a vertical section of a form of construction of the invention.

FIGS. 1A and 1B are vertical sections of a detail of FIG. 1. This casting requires a full view pattern made of moderately extendible reinforced elastomer 1 with the walls suitably sized and preshaped so that, after being filled with the compressed fluid, the pattern takes on the form envisaged.

The pattern is adjusted axially to a perforated tube 2, with the compressed fluid seal guaranteed by suitable packings 3. The tube is fastened by the lower end to the bottom plate 4 and by the top end to the cross 5. This cross is inserted in the upper part 6 of the series of moulding boxes 7 destined to receive the liquid sand 8 which is sent in by means of the device 9. Air outlets from the moulding boxes are guaranteed by a series of holes 10, to which breather plates 11 have been fitted, which do not allow the liquid sand to escape, but enable the gasses to escape during pouring of the metal.

The pattern is initially left in vacuum. While the liquid sand is being put inside the moulding boxes, the flow of compressed fluid, coming from the line 13, to the inside of the pattern, is regulated by means of the valve 12. It is advisable to regulate the flow of the compressed fluid and the liquid sand so as to balance the two quantities and complete the two filling operations at the same time.

In order to obtain the compressed pattern 14 in the desired conditions of form and consistency, the required degree of pressure must be controlled by means of the pressure gauge 15. After setting of the liquid sand (30 - 60 minutes), the valve 16 is operated in order to discharge the pressure by means of the line 17, and a vacuum may be formed by means of the line 18 in order to contract the pattern and favour its removal.

The pouring channel and gate are prepared separately in accordance with the traditional technique.

EXAMPLE 2

Moulding of large helical screws

Figure 2:
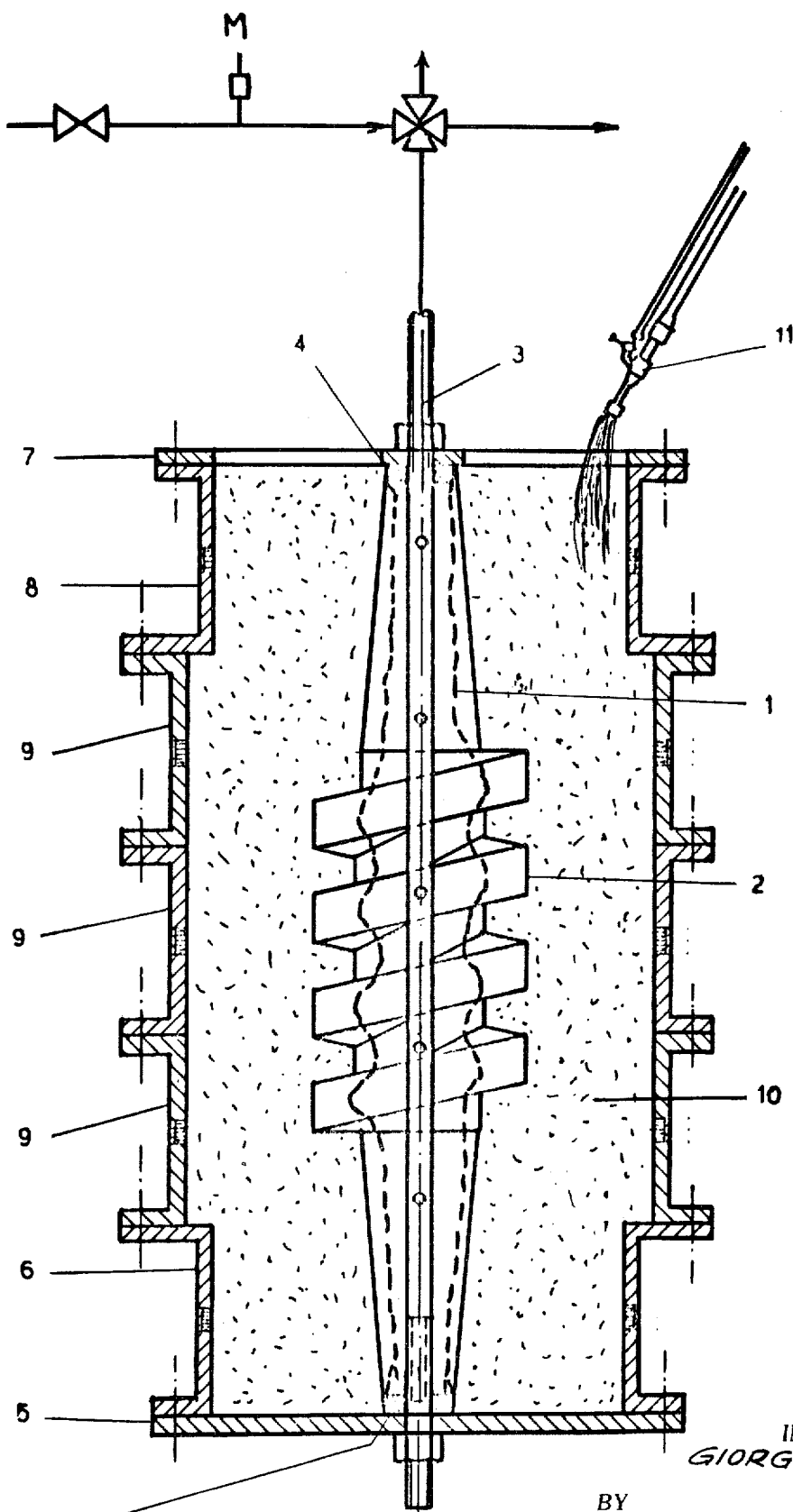
FIG. 2 is a vertical section in elevation of another embodiment of the invention.

The example can be easily understood by reference to FIG. 2. The said figure represents a vertical section of a form of construction of the invention and comprises the following parts: decompressed pattern 1, compressed pattern 2, perforated positioning tube 3, packings 4, bottom plate 5, lower part 6, cross 7, upper part 8, moulding boxes 9, liquid sand 10, and liquid sand inlet device 11. The lines and the compressed fluid inlet and discharge valves and the vacuum line are similar to those of FIG. 1.

This example is similar to Example 1, but the lug represented by the particular trend of the threads makes the case particularly instructive.

The moulding material used was a liquid sand having the following specifications:

| | |
|---|---|
| - quartziferous sand | 81.65% |
| - aluminous cement | 10 % |
| - water | 8 % |
| - surface active agents | 0.35% |
| - lithium chloride (% of cement) | 0.08% |
| - ambient temperature | 20°C. |
| - setting time | 60 mins. |
| - hardening time | 24 hours |
| - final strength | 35 Kg/cm² |

EXAMPLE 3

Figure 3:
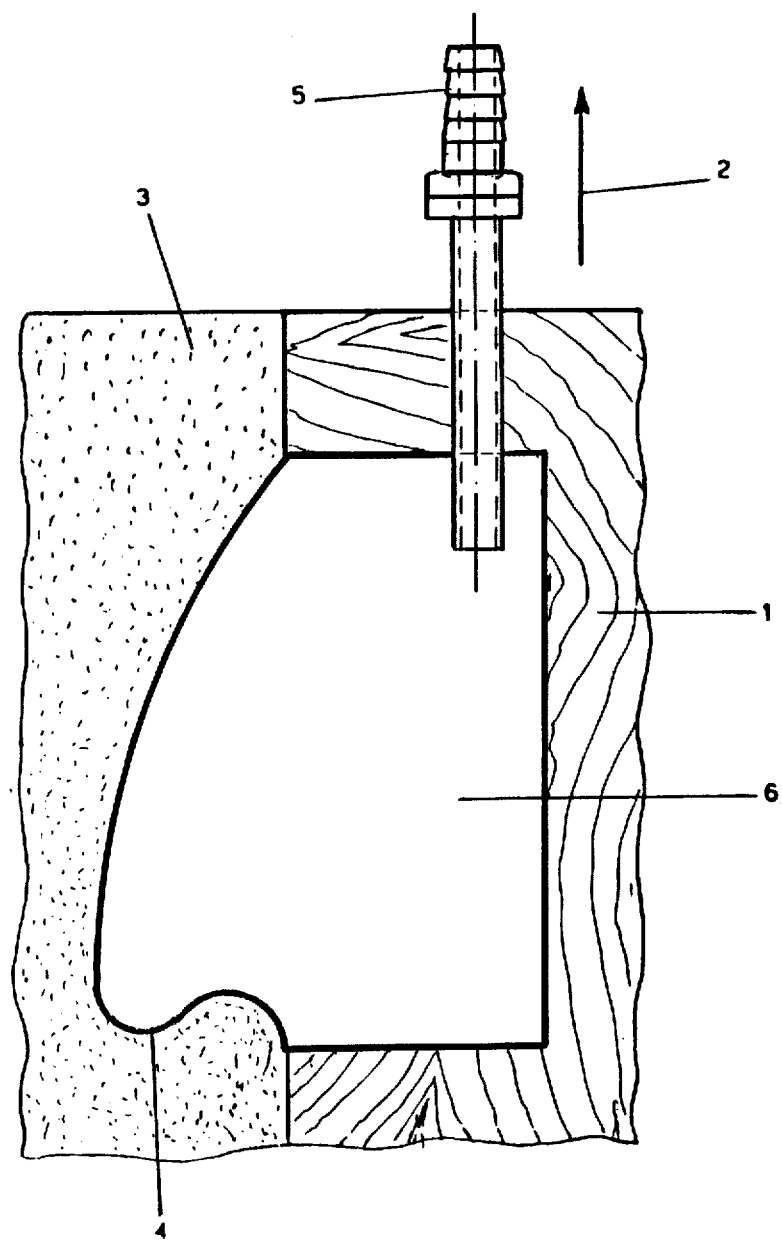
FIG. 3 is a vertical section in elevation illustrating the use of the invention for moulding an ingot mould.

Moulding of lugs by means of insertion of inflatable elastomer parts on a traditional pattern FIG. 3 represents a vertical section of a particular application of the invention for moulding an ingot mould with lugs. The process allows extraction of the wood pattern 1 of the ingot mould in the axial direction 2 after moulding with liquid sand 3.

During casting of the liquid sand the elastomer model 4 of the lug is kept rigid by means of a compressed fluid introduced through the pipe 5 into the hollow 6. After setting of the moulding material, still through the pipe 5 a vacuum is produced such as to make the elastomer 4 contract inside the hollow 6, thus making it possible to extract the pattern of the ingot mould.

I claim:

1. In the process of forming moulds for castings, comprising the steps of filling a pattern having preshaped and dimensioned walls with fluid wherein the pattern is of an extendible material selected from at least one member of the group consisting essentially of natural and synthetic rubbers which in the unfilled condition lacks shape and rigidity but which upon filling has the shape, dimensioned walls and the rigidity to define the desired profile of the mould, pouring fluidal moulding material about and in contact with the pattern while the pattern is being concurrently filled with fluid to maintain its preshaped and dimensioned walls, and thereafter contracting the pattern by withdrawing the fluid therefrom for removal of the contracted pattern from the set moulding material.

2. The process according to claim 1, wherein the moulding material essentially consists of liquid sand.

3. The process according to claim 2, wherein said liquid sand comprises from 78 to 85 percent by weight of sand, from 8 to 12 percent by weight of aluminous cement, from 7 to 10 percent by weight of water, and from 0.03 to 0.20 percent by weight of surface active agent.

4. The process according to claim 3, wherein said liquid sand includes from 0.05 to 0.03 percent in relation to the weight of the aluminous cement of a lithium salt.

5. The process according to claim 1, wherein the filling fluid is a gas.

6. In the process of forming moulds for castings, comprising the steps of filling a core box having preshaped and dimensioned walls with fluid wherein the core box is of an extendible material selected from at least one member of the group consisting essentially of natural and synthetic rubbers which in the unfilled condition lacks shape and rigidity but which upon filling has the shape, the dimensioned walls and the rigidity to define the desired profile of the mould, pouring fluidal moulding material about and in contact with the core box while the core box is being currently filled to maintain its preshaped and dimensioned walls, and thereafter contracting the core box by withdrawing the fluid therefrom for removal of the contracted core box from the set moulding material.

7. The process according to claim 6, wherein the core box essentially consists of liquid sand.

8. The process according to claim 7 wherein said liquid sand comprises from 78 to 85 percent by weight of sand, from 8 to 12 percent by weight of aluminous cement, from 7 to 10 percent by weight of water, and from 0.03 to 0.20 percent by weight of surface active agent.

9. The process according to claim 8, wherein said liquid sand includes from 0.05 to 0.03 percent in relation to the weight of the aluminous cement of a lithium salt.

* * * * *